(12) United States Patent
Creaby et al.

(10) Patent No.: US 12,005,896 B2
(45) Date of Patent: Jun. 11, 2024

(54) CONTROL SYSTEM TO DAMPEN STRUCTURAL OSCILLATIONS OF VEHICLE IMPLEMENTS

(71) Applicant: Trimble Inc., Sunnyvale, CA (US)

(72) Inventors: Justin Creaby, Westminster, CO (US); Joshua Rands, Superior, CO (US)

(73) Assignee: Trimble Inc, Sunnyvale, CA (US)

( * ) Notice: Subject to any disclaimer, the term of this patent is extended or adjusted under 35 U.S.C. 154(b) by 698 days.

(21) Appl. No.: 17/137,108

(22) Filed: Dec. 29, 2020

(65) Prior Publication Data

US 2022/0203978 A1 Jun. 30, 2022

(51) Int. Cl.
| | |
|---|---|
| *B60W 30/14* | (2006.01) |
| *A01C 23/00* | (2006.01) |
| *A01M 7/00* | (2006.01) |
| *B05B 13/00* | (2006.01) |
| *B60W 10/20* | (2006.01) |
| *B60W 10/30* | (2006.01) |
| *G01C 19/00* | (2013.01) |
| *H04Q 9/00* | (2006.01) |

(52) U.S. Cl.
CPC ......... *B60W 30/143* (2013.01); *A01C 23/007* (2013.01); *A01M 7/0089* (2013.01); *B60W 10/20* (2013.01); *B60W 10/30* (2013.01); *H04Q 9/00* (2013.01); *B05B 13/005* (2013.01); *G01C 19/00* (2013.01)

(58) Field of Classification Search
CPC .... B60W 30/143; B60W 10/20; B60W 10/30; A01C 23/007; A01M 7/0089; H04Q 9/00; B05B 13/005; G01C 19/00
See application file for complete search history.

(56) References Cited

U.S. PATENT DOCUMENTS

| | | | | |
|---|---|---|---|---|
| 2003/0074120 A1* | 4/2003 | Kleinau | ............... | B62D 5/0466 180/443 |
| 2006/0229782 A1* | 10/2006 | Deng | .................... | B62D 6/003 180/443 |
| 2008/0036296 A1* | 2/2008 | Wu | ........................ | B60W 50/06 303/146 |
| 2008/0228354 A1* | 9/2008 | Kimura | ................ | B62D 5/0463 701/42 |
| 2008/0269988 A1* | 10/2008 | Feller | ...................... | G01S 19/14 701/41 |

(Continued)

OTHER PUBLICATIONS

Extended European Search Report for Application No. 21215137.7-1105, dated May 23, 2022, 12 pages.

*Primary Examiner* — Luis A Martinez Borrero

(57) ABSTRACT

Described herein are systems, methods, and other techniques for damping oscillations of an implement of a vehicle while the vehicle is moving. Sensor data is captured using one or more sensors that are attached to the vehicle. The sensor data is analyzed to extract one or both of symmetric oscillation information or asymmetric oscillation information. One or both of a speed damping signal or a steering damping signal are generated based on analyzing the sensor data. The speed damping signal is generated in response to extracting the symmetric oscillation information and the steering damping signal is generated in response to extracting the asymmetric oscillation information. A movement of the vehicle is modified using one or both of the speed damping signal or the steering damping signal.

19 Claims, 7 Drawing Sheets

(56) References Cited

U.S. PATENT DOCUMENTS

| | | | |
|---|---|---|---|
| 2011/0029210 A1* | 2/2011 | Wu | B60D 1/58 |
| | | | 188/112 A |
| 2011/0054729 A1* | 3/2011 | Whitehead | G01S 19/14 |
| | | | 701/50 |
| 2012/0174445 A1* | 7/2012 | Jones | A01B 69/004 |
| | | | 37/197 |
| 2012/0215410 A1* | 8/2012 | McClure | A01B 79/005 |
| | | | 701/50 |
| 2014/0324291 A1* | 10/2014 | Jones | G05D 1/0274 |
| | | | 701/41 |
| 2015/0165850 A1* | 6/2015 | Chiu | B60D 1/30 |
| | | | 701/1 |
| 2016/0280221 A1* | 9/2016 | Jung | B60W 30/02 |
| 2018/0281798 A1* | 10/2018 | Kremmer | A01M 7/0089 |
| 2020/0147631 A1* | 5/2020 | Borchert | A01M 7/0089 |
| 2021/0289766 A1* | 9/2021 | Long | B60G 99/002 |

\* cited by examiner

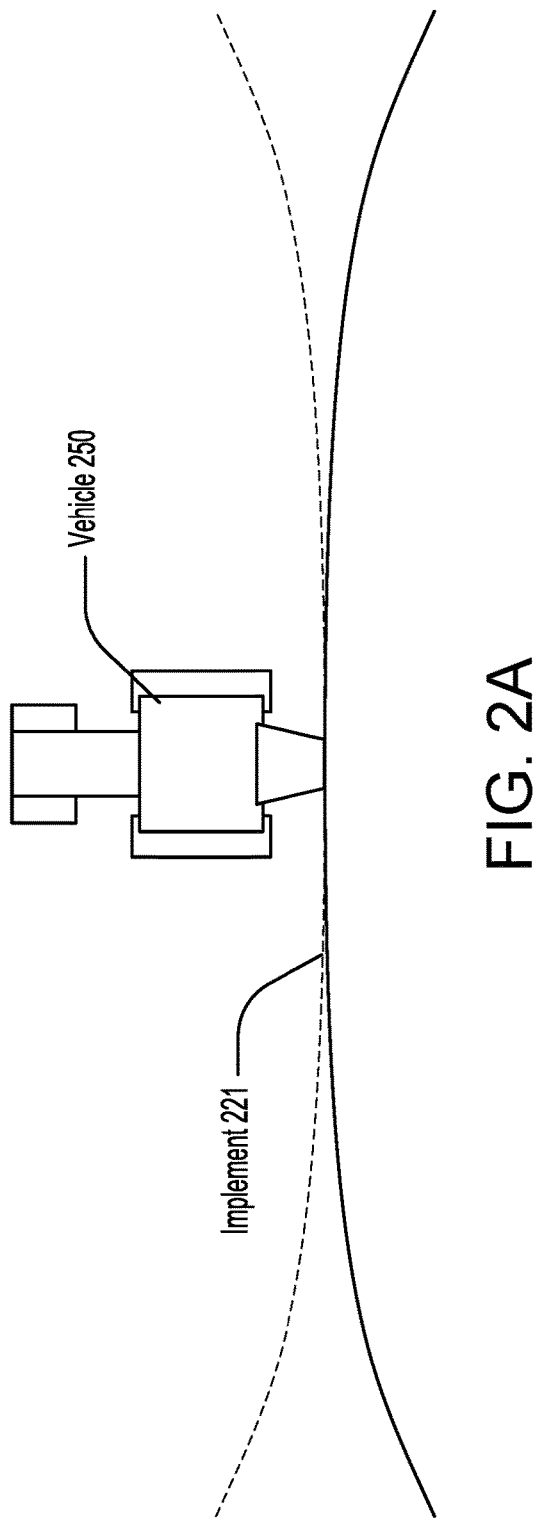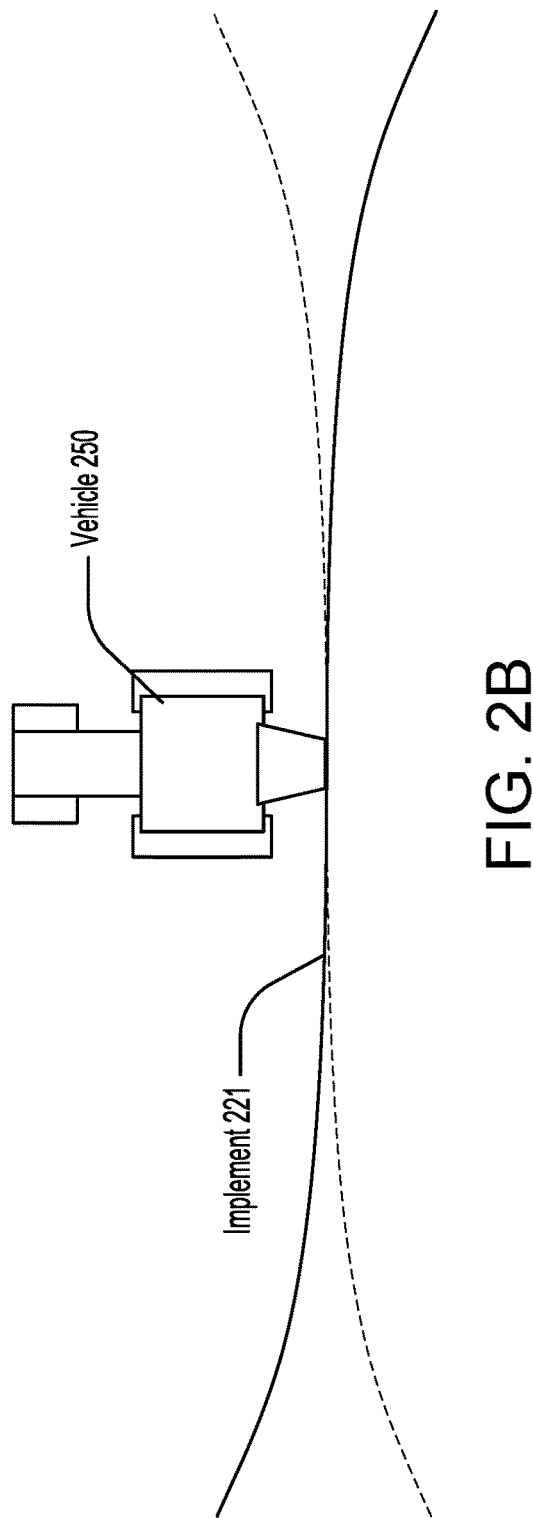

CONTROL SYSTEM TO DAMPEN STRUCTURAL OSCILLATIONS OF VEHICLE IMPLEMENTS

BACKGROUND OF THE INVENTION

Modern mobile machinery, including construction and agricultural machines, have dramatically increased the efficiency of performing various work-related tasks. For example, earthmoving machines employing automatic slope control systems are able to grade project areas using fewer passes than what was previously done manually. As another example, modern asphalt pavers and other road makers have allowed replacement of old roads and construction of new roads to occur on the order of hours and days instead of what once took place over weeks and months. Due to the automation of various aspects, construction and agriculture projects can be carried out by crews with fewer individuals than what was previously required. Much of the technological advances of mobile machinery are owed in part to the availability of accurate sensors that allow real-time monitoring of the condition and position of a machine's components and/or the environment surrounding the machine.

In some instances, modern mobile agricultural machines have dramatically increased the efficiency of harvesting a variety of grain crops, including wheat, corn, oats, rye, barley, among others. Such machines may be guided in part by various cameras and sensors mounted to the machines, such as one or more global navigation satellite systems (GNSS) receivers which use wireless signals transmitted from medium Earth orbit (MEO) satellites to generate position estimates of the machines. The emergence of self-driving harvesting combines along with other row-guided farm vehicles has reduced the amount of row overlap, which has translated into reduced fuel costs and less wear to the vehicles.

Despite the improvements to modern mobile machinery, new systems, methods, and techniques are still needed.

BRIEF SUMMARY OF THE INVENTION

The following description relates broadly to techniques for reducing oscillations that occur when a mobile machine carrying an elongated implement is moving. Specifically, the present description relates to a technique in which sensors mounted to the agricultural sprayer capture sensor data indicative of the oscillations, the sensor data is analyzed to detect the oscillations, and a damping signal is generated and combined with an existing control signal to reduce the oscillations. While the present description is described primarily in reference to an agricultural machine with a sprayer boom, the description is applicable to a wide variety of agricultural machines, construction machines, mobile machinery, or heavy equipment.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of damping oscillations of an implement of a vehicle while the vehicle is moving, the method comprising: capturing sensor data using one or more sensors that are attached to the vehicle; analyzing the sensor data to extract one or both of symmetric oscillation information or asymmetric oscillation information, wherein extracting the symmetric oscillation information includes extracting a frequency and a phase corresponding to symmetric oscillations of the vehicle, and wherein extracting the asymmetric oscillation information includes extracting a frequency and a phase corresponding to asymmetric oscillations of the vehicle; generating one or both of a speed damping signal or a steering damping signal based on analyzing the sensor data, wherein the speed damping signal is generated in response to extracting the symmetric oscillation information and the steering damping signal is generated in response to extracting the asymmetric oscillation information; and modifying a movement of the vehicle using one or both of the speed damping signal or the steering damping signal.

Example 2 is the method of example(s) 1, wherein capturing the sensor data includes capturing accelerometer data using an accelerometer attached to the vehicle.

Example 3 is the method of example(s) 2, wherein the symmetric oscillation information is extracted from the accelerometer data.

Example 4 is the method of example(s) 1-3, wherein capturing the sensor data includes capturing gyro data using a gyroscope attached to the vehicle.

Example 5 is the method of example(s) 4, wherein the asymmetric oscillation information is extracted from the gyro data.

Example 6 is the method of example(s) 1-5, wherein modifying the movement of the vehicle using the speed damping signal includes combining the speed damping signal with an existing speed signal.

Example 7 is the method of example(s) 1-6, wherein modifying the movement of the vehicle using the steering damping signal includes combining the steering damping signal with an existing steering signal.

Example 8 is the method of example(s) 1-7, wherein the speed damping signal is generated to include the frequency corresponding to the symmetric oscillations.

Example 9 is the method of example(s) 1-8, wherein the steering damping signal is generated to include the frequency corresponding to the asymmetric oscillations.

Example 10 is a non-transitory computer-readable medium comprising instructions that, when executed by one or more processors, cause the one or more processors to perform operations for damping oscillations of an implement of a vehicle while the vehicle is moving, the operations comprising: capturing sensor data using one or more sensors that are attached to the vehicle; analyzing the sensor data to extract one or both of symmetric oscillation information or asymmetric oscillation information, wherein extracting the symmetric oscillation information includes extracting a frequency and a phase corresponding to symmetric oscillations of the vehicle, and wherein extracting the asymmetric oscillation information includes extracting a frequency and a phase corresponding to asymmetric oscillations of the vehicle; generating one or both of a speed damping signal or a steering damping signal based on analyzing the sensor data, wherein the speed damping signal is generated in response to extracting the symmetric oscillation information and the steering damping signal is generated in response to extracting the asymmetric oscillation information; and modifying a movement of the vehicle using one or both of the speed damping signal or the steering damping signal.

Example 11 is the non-transitory computer-readable medium of example(s) 10, wherein capturing the sensor data includes capturing accelerometer data using an accelerometer attached to the vehicle.

Example 12 is the non-transitory computer-readable medium of example(s) 11, wherein the symmetric oscillation information is extracted from the accelerometer data.

Example 13 is the non-transitory computer-readable medium of example(s) 10-12, wherein capturing the sensor data includes capturing gyro data using a gyroscope attached to the vehicle.

Example 14 is the non-transitory computer-readable medium of example(s) 13, wherein the asymmetric oscillation information is extracted from the gyro data.

Example 15 is the non-transitory computer-readable medium of example(s) 10-14, wherein modifying the movement of the vehicle using the speed damping signal includes combining the speed damping signal with an existing speed signal.

Example 16 is a system for damping oscillations of an implement of a vehicle while the vehicle is moving, the system comprising: one or more processors; and a computer-readable medium comprising instructions that, when executed by the one or more processors, cause the one or more processors to perform operations comprising: capturing sensor data using one or more sensors that are attached to the vehicle; analyzing the sensor data to extract one or both of symmetric oscillation information or asymmetric oscillation information, wherein extracting the symmetric oscillation information includes extracting a frequency and a phase corresponding to symmetric oscillations of the vehicle, and wherein extracting the asymmetric oscillation information includes extracting a frequency and a phase corresponding to asymmetric oscillations of the vehicle; generating one or both of a speed damping signal or a steering damping signal based on analyzing the sensor data, wherein the speed damping signal is generated in response to extracting the symmetric oscillation information and the steering damping signal is generated in response to extracting the asymmetric oscillation information; and modifying a movement of the vehicle using one or both of the speed damping signal or the steering damping signal.

Example 17 is the system of example(s) 16, wherein capturing the sensor data includes capturing accelerometer data using an accelerometer attached to the vehicle.

Example 18 is the system of example(s) 17, wherein the symmetric oscillation information is extracted from the accelerometer data.

Example 19 is the system of example(s) 16-18, wherein capturing the sensor data includes capturing gyro data using a gyroscope attached to the vehicle.

Example 20 is the system of example(s) 19, wherein the asymmetric oscillation information is extracted from the gyro data.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIGS. 2A and 2B illustrate different types of oscillations that may occur for a vehicle when equipped with an implement.

Figure 1:
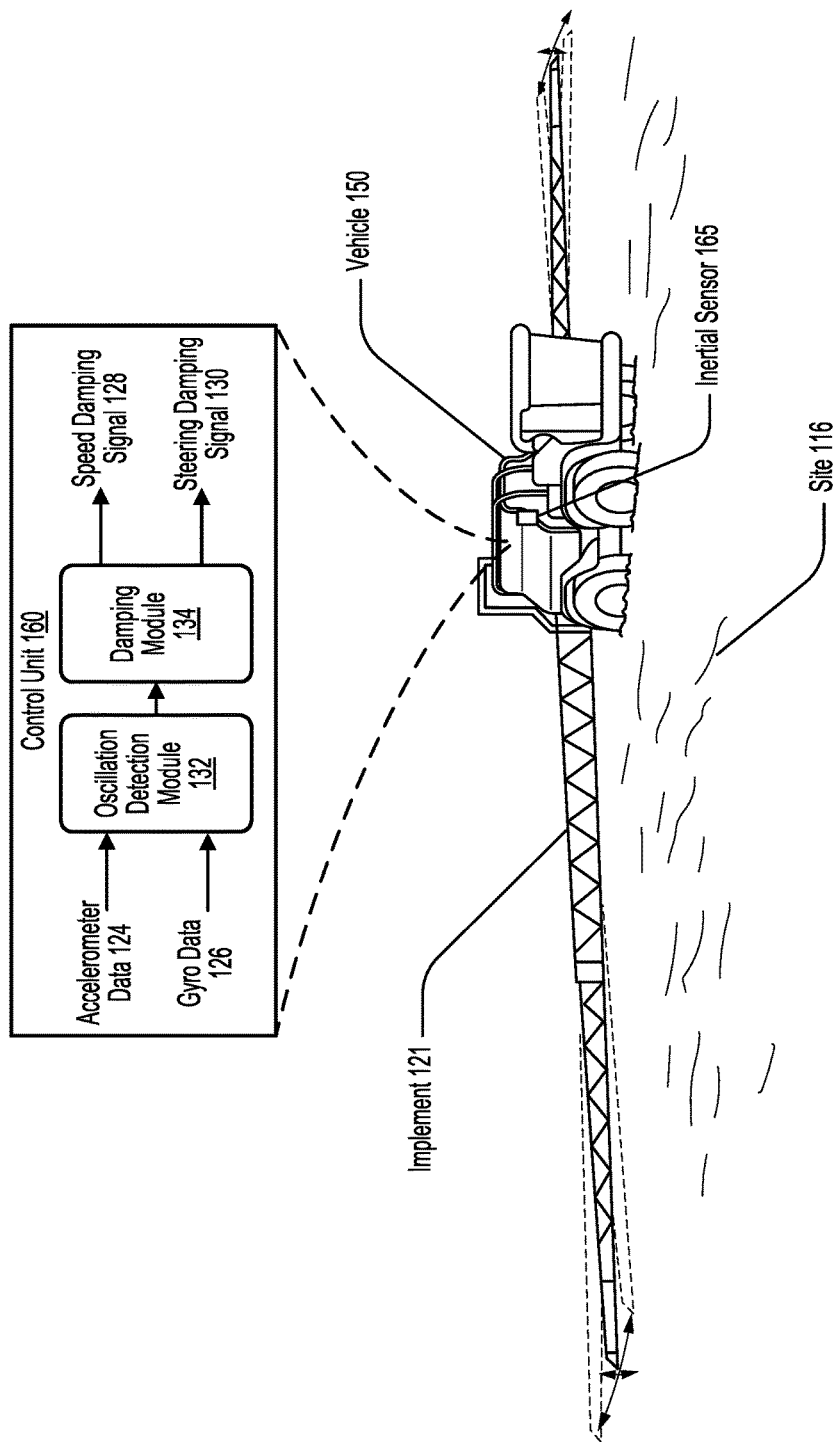
FIG. 1 illustrates an example of one or more techniques of the present disclosure being implemented within an agricultural environment.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

Agricultural sprayers are mobile machinery that deploy long sprayer booms to deliver liquids at an agricultural site. The delivered liquids may contain fertilizer, herbicide, insecticide, plant food, water, among other possibilities, as well as various combinations thereof. Typically, the sprayer boom is attached to the tractor portion of the vehicle at a center portion along the boom, extending outward in either direction above the ground at a constant or near constant height. In some instances, the sprayer boom can be as long as 45 meters. To achieve such lengths, the sprayer boom may have high stiffness in the vertical direction and low stiffness in the horizontal direction (e.g., the fore-aft direction). The vertical stiffness may be achieved using a truss framework made from materials that attempt to make the sprayer boom strong yet lightweight.

During operation of the agricultural sprayer, the sprayer boom can experience structural oscillations that can lead to fatigue or extreme load failure. These oscillations can be exacerbated by high winds, vibrations caused by the vehicle, variations in vehicle speed, variations in terrain, among other possibilities. One approach to deal with the oscillations has been to design the sprayer boom with heavier and more expensive materials, such as steel. However, these materials both increase the cost of the sprayer boom and increase the amount of energy to move a vehicle having a greater mass.

Embodiments of the present invention relate to systems, methods, and other techniques for damping the oscillations caused by sprayer booms of agricultural sprayers using modified speed and/or steering commands. While the vehicle is moving, one or more sensors mounted to the agricultural sprayer may capture sensor data indicative of the structural oscillations. The sensor data may be analyzed by a control unit to detect (1) whether the oscillations include symmetric oscillations and/or asymmetric oscillations and (2) a corresponding frequency and phase (or multiple frequencies and phases) for the detected oscillations. Damping signals are then generated based on the detected oscillations and are combined with the existing speed signal and/or the existing steering signal. By modifying the speed and/or steering of the vehicle using the damping signals, the oscillations can be significantly reduced, resulting in improved performance of the agricultural sprayer.

Various benefits are achieved by way of the present invention. For example, combining fore-aft and yaw damping can allow damping of higher order modes and any combination of symmetric and asymmetric modes. With the right timing and amplitude of the generated damping signals, the signals can dampen any boom oscillation. The damping sinusoidal commands added on top of the existing guidance commands are beneficial in that they are small, have a mean value of zero, and are unnoticeable to the machine operator. This allows existing control schemes to be unaffected while the oscillation detection and damping module is running. Other benefits of the present invention will be readily apparent to those skilled in the art.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the embodiments being described.

FIG. 1 illustrates an example of one or more techniques of the present disclosure being implemented within an agricultural environment. Specifically, FIG. 1 shows a vehicle 150 being deployed at a site 116 and having the control thereof at least partially implemented by a control unit 160 which, in various embodiments, may be communicatively coupled to an inertial sensor 165 mounted to vehicle 150 through a wired and/or wireless connection. While site 116 is generally described herein as corresponding to an agricultural site such as a field, the present disclosure is applicable to a wide variety of construction, maintenance, or agricultural projects in which heavy equipment or mobile machinery are used. Similarly, while vehicle 150 is generally described herein as corresponding to an agricultural sprayer, the various techniques described herein are applicable to a wide variety of agricultural machines, construction machines, or heavy equipment such as graders, excavators, bulldozers, backhoes, pavers (e.g., concrete, asphalt, slipform, vibratory, etc.), compactors, scrapers, loaders, material handlers, combine harvesters, and the like.

In some embodiments, vehicle 150 may include a tractor with wheels, axles, and a gasoline-, diesel-, electric-, or steam-powered engine for providing power and traction to vehicle 150 to drive along a desired path, often at a constant speed. Vehicle 150 may be a tracked vehicle that incorporates a continuous track of treads or track plates that are driven by the vehicle's wheels. An operator of vehicle 150 may provide inputs to control unit 160 using various input devices such as levers, switches, buttons, pedals, steering wheels, and touch screens, which can cause various actuators to move vehicle 150.

In some instances, vehicle 150 may include an implement 121, which may have an elongated body that extends horizontally from both sides of vehicle 150 at a constant or near constant height. For example, at an agricultural site, implement 121 may be the boom sprayer of vehicle 150 that delivers liquids over a wide area as vehicle 150 moves along a row. As another example, implement 121 may be the header of a combine harvester. In other examples, at a construction site, implement 121 may be the blade of a bulldozer, the bucket of an excavator, or the drum of a compactor. As another example, at a road construction site, implement 121 may be the screed of an asphalt paver.

It should be appreciated that, in some embodiments, implement 121 and vehicle 150 may be considered to be separate bodies that have a semi-rigid coupling between them. The coupling is semi-rigid in that the bodies can move relative to each other but they can also be fixed at a given orientation. Some examples of semi-rigid couplings used on mobile machinery include c-frames, angle c-frames, push arms, L-shaped push arms, and the like.

In some embodiments, control unit 160 may receive sensor data from one or more sensors attached to vehicle 150. The sensor data may include accelerometer data 124 captured by one or more accelerometers and/or gyro data 126 captured by one or more gyroscopes. The sensor data may be provided to an oscillation detection module 132 that analyzes the sensor data and extracts oscillation information, including a type of oscillation (symmetric and/or asymmetric) and a frequency and phase associated with the oscillation. The extracted oscillation information may be provided to a damping module 134 that generates a speed damping signal 128 and/or a steering damping signal 130 based on this oscillation information. These damping signals may be used to modify the existing speed and steering signals to reduce the oscillations and improve the performance of vehicle 150 while operating within site 116.

FIGS. 2A and 2B illustrate the different types of oscillations that may occur for a vehicle 250 when equipped with an implement 221. In some instances, implement 221 may be considered to be attached to a tractor (or cab) portion of vehicle 250 at a center portion of implement 221 such that one half of implement 221 (e.g., the left half) is disposed on one side of the tractor portion of vehicle 250 and the other half of implement 221 (e.g., the right half) is disposed on the other side of the tractor portion of vehicle 250.

FIG. 2A shows an example of symmetric oscillation, which occurs when both sides of implement 221 synchronously oscillate or oscillate in phase with each other. For example, during symmetric oscillation, the left side of implement 221 may reach a maximum deflection in the fore direction at the same time that the right side of implement 221 reaches a maximum deflection in the fore direction. Similarly, the left side of implement 221 may reach a maximum deflection in the aft direction at the same time that the right side of implement 221 reaches a maximum deflection in the aft direction. Damping of symmetric oscillation can be accomplished with speed commands that cause accelerations or decelerations in the fore-aft direction that counteract the symmetric oscillations.

FIG. 2B shows an example of asymmetric oscillation, which occurs when the sides of implement 221 oscillate with opposite phases. For example, during asymmetric oscillation, the left side of implement 221 may reach a maximum deflection in the fore direction at the same time that the right side of implement 221 reaches a maximum deflection in the aft direction. Similarly, the left side of implement 221 may reach a maximum deflection in the aft direction at the same time that the right side of implement 221 reaches a maximum deflection in the fore direction. Damping of asymmetric oscillation can be accomplished with steering commands that cause yaw movements that counteract the asymmetric oscillations.

Figure 3:
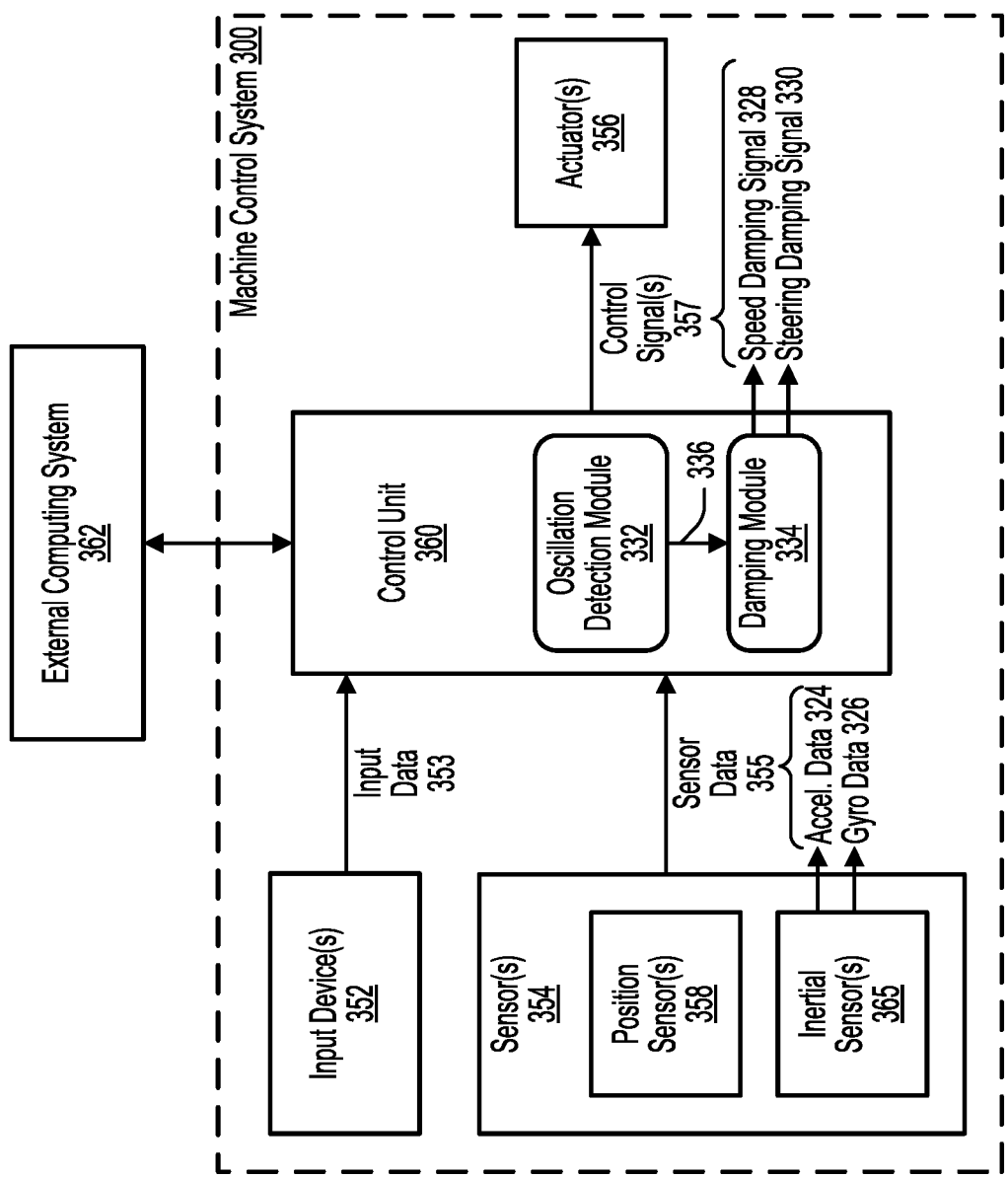
FIG. 3 illustrates an example machine control system.

FIG. 3 illustrates an example machine control system 300, in accordance with some embodiments of the present disclosure. Machine control system 300 may include various input devices 352, sensors 354, actuators 356, and computing devices for allowing one or more operators of the vehicle to complete a work-related task. The components of machine control system 300 may be mounted to or integrated with the components of the vehicle such that the vehicle may be considered to include machine control system 300. The components of machine control system 300 may be communicatively coupled to each other via one or more wired and/or wireless connections.

Machine control system 300 may include a control unit 360 that receives data from the various sensors and inputs and generates commands that are sent to the various actuators and output devices. In the illustrated example, control unit 360 receives input data 353 from input device(s) 352 and sensor data 355 from sensor(s) 354, and generates control signal(s) 357, which are sent to actuator(s) 356. Control unit 360 may include one or more processors and an associated memory. In some embodiments, control unit 360 may be communicatively coupled to an external computing system 362 located external to machine control system 300 and the vehicle. External computing system 362 may send instructions to control unit 360 of the details of a work-related task. External computing system 362 may also send alerts and other general information to control unit 360, such as traffic conditions, weather conditions, the locations and status of material transfer vehicles, and the like.

In some embodiments, input device(s) 352 may receive input data 353 that indicates a desired movement of the vehicle, a desired movement of the implement, a desired height of the implement, an activation of one or more mechanisms on the implement (e.g., sprayers, cutters, etc.), and the like. Input device(s) 352 may include a keyboard, a touchscreen, a touchpad, a switch, a lever, a button, a steering wheel, an acceleration pedal, a brake pedal, and the like. In some embodiments, input device(s) 352 may be mounted to any physical part of the vehicle, such as within the cab of the vehicle.

In some embodiments, sensor(s) 354 may include one or more position sensor(s) 358 and/or inertial sensor(s) 365. Position sensor(s) 358 may be a combination of GNSS receivers, which determine position using wireless signals received from satellites, and total stations, which determine position by combining distance, vertical angle, and horizontal angle measurements. Inertial sensor(s) 365 may include one or more sensors that detect movement of the components of the vehicle to which they are rigidly attached. For example, inertial sensor(s) 365 may include one or more gyroscopes for detecting angular acceleration, angular rate and/or angular position, one or more accelerometers for detecting linear acceleration, linear velocity, and/or linear position, one or more inertial measurement units (IMUs) which may each include one or more accelerometers, one or more gyroscopes, and/or one or more magnetometers for detecting the above-listed types of data, among other possibilities. In some instances, sensor data 355 includes accelerometer data 324, which is data captured by an accelerometer of inertial sensor(s) 365, and/or gyro data 326, which is data captured by a gyroscope of inertial sensor(s) 365.

In some embodiments, inertial sensor(s) 365 may directly detect angular rate and may integrate to obtain angular position, or alternatively an inertial sensor may directly measure angular position and may determine a change in angular position (e.g., compute the derivative) to obtain angular rate. In many instances, inertial sensor(s) 365 can be used to determine the yaw angle (rotation angle with respect to a vertical axis), the pitch angle (rotation angle with respect to a transverse axis), and/or the roll angle (rotation angle with respect to a longitudinal axis) of the vehicle.

Control unit 360 may include various controllers and modules to assist in the generation of control signal(s) 357. Each of the controllers and modules may include dedicated hardware and/or may be performed using the main processor and/or memory of control unit 360. In some embodiments, control unit 360 includes an oscillation detection module 332 that extracts oscillation information 336 from accelerometer data 324 and gyro data 326 as well as a damping module 334 that generates a speed damping signal 328 and a steering damping signal 330 based on the oscillation information. Each of speed damping signal 328 and steering damping signal 330 may be used to generate control signal(s) 357 and/or may be used to modify existing control signal(s) 357, such as an existing speed signal and an existing steering signal.

Control signal(s) 357 may include direct current (DC) or alternating current (AC) voltage signals, DC or AC current signals, and/or information-containing signals. In some instances, control signal(s) 357 include a pneumatic or hydraulic pressure. Upon receiving control signal(s) 357, actuator(s) 356 may be caused to move in a specified manner, such as by extending, retracting, rotating, lifting, or lowering by a specified amount. Actuator(s) 356 may use various forms of power to provide movement to the components of the vehicle. For example, actuator(s) 356 may be electric, hydraulic, pneumatic, mechanical, or thermal, among other possibilities.

Figure 4:
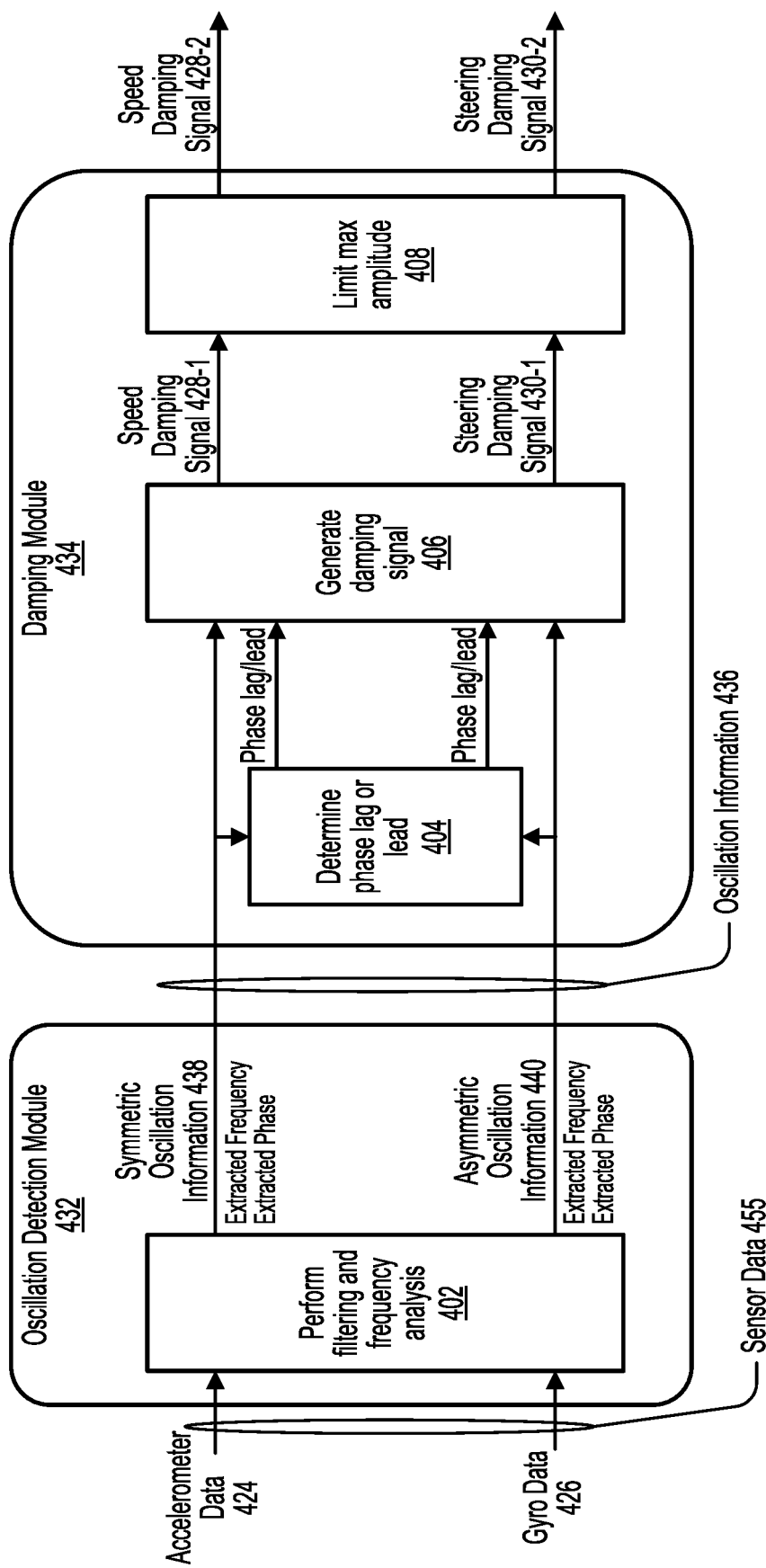
FIG. 4 illustrates an example oscillation detection module and an example damping module.

FIG. 4 illustrates an example oscillation detection module 432 and an example damping module 434, in accordance with some embodiments of the present disclosure. FIG. 4 shows example actions 402, 404, 406, and 408 that may be performed by modules 432 and 434 to produce a speed damping signal 428 and/or a steering damping signal 430 based on sensor data 455, which may include accelerometer data 424 and/or gyro data 426. Each of modules 432 and 434 may include dedicated hardware to perform actions 402, 404, 406, and 408 or, in some embodiments, the actions may be performed using a general-purpose processor.

At action 402, filtering and frequency analysis is performed by oscillation detection module 432 on sensor data 455, which may include accelerometer data 424 and gyro data 426. In some instances, the resulting data is referred to as oscillation information 436, which may include symmetric oscillation information 438 and asymmetric oscillation information 440. For example, performing action 402 may result in symmetric oscillation information 438 being extracted from accelerometer data 424 and asymmetric oscillation information 440 being extracted from gyro data 426.

Symmetric oscillation information 438 may include an extracted frequency and an extracted phase corresponding to the symmetric oscillations of the vehicle. In some examples, to obtain the extracted frequency and phase, oscillation detection module 432 may analyze an acceleration signal in the fore-aft direction of the vehicle contained in accelerometer data 424. The acceleration signal may include positive and negative acceleration values expressed as a function of time. The acceleration signal may be filtered using a moving band-pass filter to find the frequency of the symmetric oscillations.

In some examples, the band-pass filter may have a constant bandwidth with moving lower and upper cutoff frequencies. The band-pass filter may begin at low frequencies (for the lower and upper cutoff frequencies) and may move upward toward high frequencies, stopping at a number of intermediate frequencies. At each of the intermediate frequencies, the power or amplitude in the acceleration signal may be calculated to determine whether it exceeds a threshold or whether a maximum power or amplitude is found. The intermediate frequency at which the power or amplitude exceeds the threshold (or is a maximum power or amplitude) is determined to be the extracted frequency. The corresponding phase is determined to be the extracted phase.

Alternatively or additionally, the same steps may be performed with the band-pass filter beginning at high frequencies (for the lower and upper cutoff frequencies) and moving downward toward low frequencies. In some examples, oscillation detection module 432 may use a previously determined extracted frequency for subsequent extractions of symmetric oscillation information 438. For example, a particular implement of a particular vehicle can be expected to repeatedly symmetrically oscillate at the same frequency. Oscillation detection module 432 may thus look to the same extracted frequency to find the extracted phase and the power or amplitude of the acceleration signal.

Similar to that described above in reference to symmetric oscillation information 438, asymmetric oscillation information 440 may include an extracted frequency and an extracted phase corresponding to the asymmetric oscillations of the vehicle. In some examples, to obtain the extracted frequency and phase, oscillation detection module 432 may analyze a yaw signal or gyro signal contained in gyro data 426. The yaw signal may include positive and negative yaw values expressed as a function of time. The yaw signal may be filtered using a moving band-pass filter to find the frequency of the asymmetric oscillations.

In some examples, the band-pass filter may have a constant bandwidth with moving lower and upper cutoff frequencies. The band-pass filter may begin at low frequencies (for the lower and upper cutoff frequencies) and may move upward toward high frequencies, stopping at a number of intermediate frequencies. At each of the intermediate frequencies, the power or amplitude in the yaw signal may be calculated to determine whether it exceeds a threshold or whether a maximum power or amplitude is found. The intermediate frequency at which the power or amplitude exceeds the threshold (or is a maximum power or amplitude) is determined to be the extracted frequency. The corresponding phase is determined to be the extracted phase.

Alternatively or additionally, the same steps may be performed with the band-pass filter beginning at high frequencies (for the lower and upper cutoff frequencies) and moving downward toward low frequencies. In some examples, oscillation detection module 432 may use a previously determined extracted frequency for subsequent extractions of asymmetric oscillation information 440. For example, a particular implement of a particular vehicle can be expected to repeatedly asymmetrically oscillate at a same frequency. Oscillation detection module 432 may thus look to the same extracted frequency to find the extracted phase and the power or amplitude of the yaw signal.

Alternatively or additionally, filtering and frequency analysis may be performed on sensor data 455 that includes data other than accelerometer data 424 and gyro data 426. In some examples, sensor data 455 may include data that is directly indicative of the motion or bending of the implement. For example, on boom sensing may be employed by using a strain gauge that is integrated into the implement that captures data that is indicative of the strain on the implement. Such data may be analyzed to extract symmetric and/or asymmetric oscillation information that includes frequencies and phases, as described above. In some examples, sensor data 455 may include data captured by sensors that are mounted to the vehicle and are directed toward the implement. Such sensors may employ a number of technologies such as LiDAR, radar, and various image capture technologies (e.g., cameras). The captured data may be analyzed to extract oscillation information as described above.

In some implementations, asymmetric oscillation information 440 may be extracted from accelerometer data 424 instead of gyro data 426 or in addition to gyro data 426. For example, multiple accelerometers may be attached to the implement and may capture data that is indicative of the asymmetric oscillations of the implement. In one example, two accelerometers may be attached at opposite ends of the implement and their captured acceleration signals may be analyzed to determine a yaw signal that includes positive and negative yaw values expressed as a function of time. Other possibilities are contemplated.

At action 404, a phase lag or lead for each of the extracted frequencies is determined by damping module 434. The determined phase lag or lead for symmetric oscillation information 438 is used for generating speed damping signal 428 and the determined phase lag or lead for asymmetric oscillation information 440 is used for generating steering damping signal 430. For example, while the extracted frequency and phase corresponding to symmetric oscillations can be accurately identified by oscillation detection module 432, the control signal that is generated to dampen such oscillations may incorporate a phase lag or lead based on the response time of the actuators of the vehicle as well as the physical characteristics of the vehicle. In some instances, damping module 434 may dynamically determine the phase lag or lead by varying its value until a maximum damping is obtained for each of the symmetric oscillations and asymmetric oscillations.

At action 406, speed damping signal 428-1 and steering damping signal 430-1 are generated by damping module 434. In some instances, each of the damping signals may be sinusoidal having a frequency equal to the extracted frequency and a phase based on the extracted phase and/or the determined phase lag or lead. The amplitude of each of the damping signals may be determined based on the amplitude or power of either the acceleration signal or the yaw signal (e.g., the amplitude or power after filtering the acceleration and yaw signals).

For example, the frequency of speed damping signal 428-1 may be equal to the extracted frequency contained in symmetric oscillation information 438 and the phase of speed damping signal 428-1 may be equal to the extracted phase contained in symmetric oscillation information 438 combined with (e.g., added to) the phase lag or lead determined at action 404 for reducing symmetric oscillations. Similarly, the frequency of steering damping signal 430-1 may be equal to the extracted frequency contained in asymmetric oscillation information 440 and the phase of steering damping signal 430-1 may be equal to the extracted phase contained in asymmetric oscillation information 440 combined with (e.g., added to) the phase lag or lead determined at action 404 for reducing asymmetric oscillations.

At action 408, speed damping signal 428-2 and steering damping signal 430-2 are generated by damping module 434 by limiting the maximum amplitude of speed damping signal 428-1 and steering damping signal 430-1, respectively. Limiting the maximum amplitude can prevent the system from overcorrecting and causing excessive movement of the actuators, which can damage the vehicle. In some instances, action 408 can be performed simultaneously or concurrently with action 406.

Figure 5:
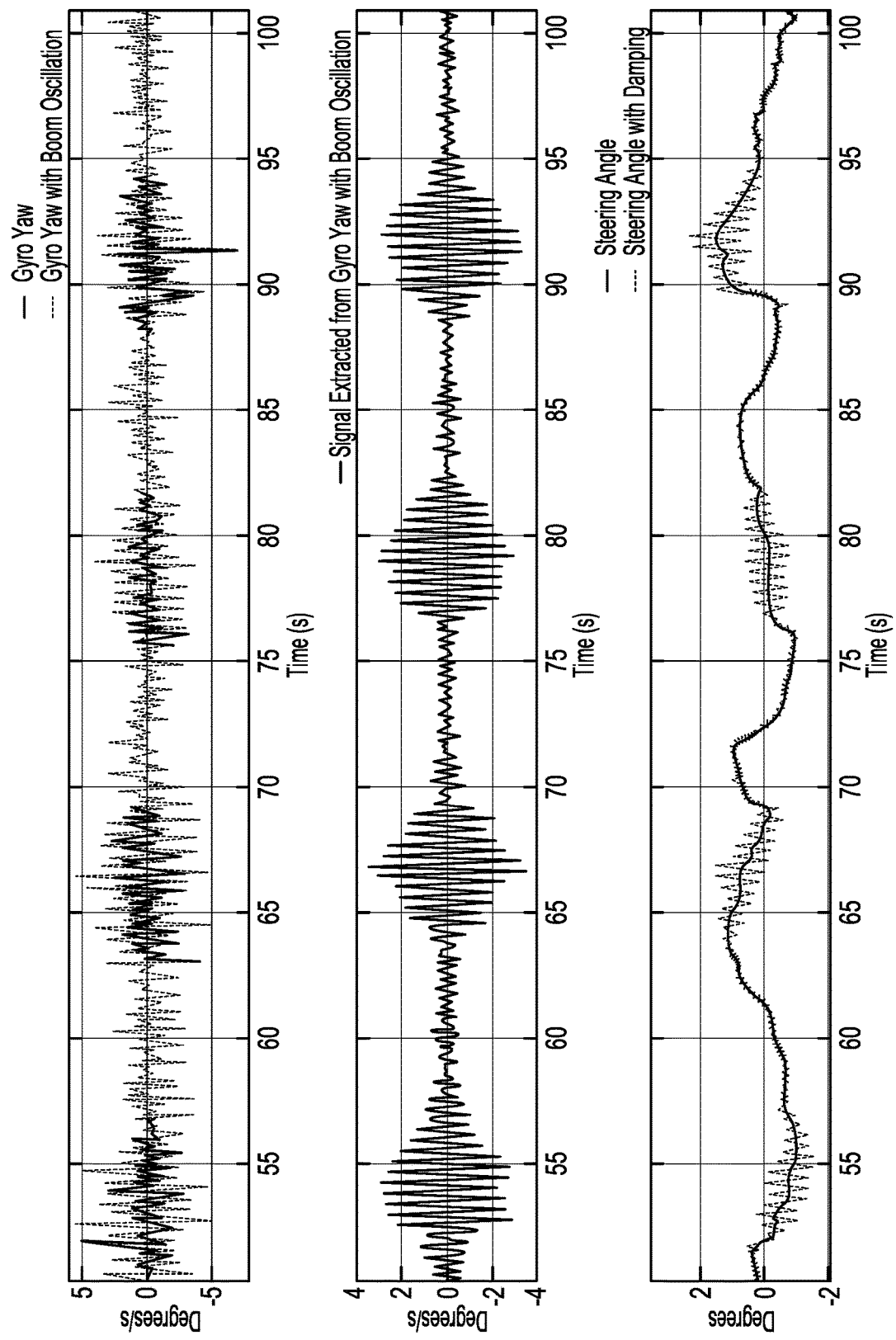
FIG. 5 illustrates various plots showing a reduction of asymmetric oscillations of an implement.

FIG. 5 illustrates various plots showing an example of the described techniques being implemented to reduce asymmetric oscillations of an implement, in accordance with some embodiments of the present disclosure. In the upper plot, a yaw signal (or gyro signal) is shown as a function of time for a first scenario in which there are no oscillations and also for a second scenario in which there are asymmetric oscillations.

In the middle plot, extracted asymmetric oscillation information is shown in the form of an extracted signal having an extracted frequency and an extracted phase. In some embodiments, the extracted signal is obtained by applying a band-pass filter to the yaw signal with asymmetric oscillations, the band-pass filter having a lower cutoff frequency near and below the extracted frequency and an upper cutoff frequency near and above the extracted frequency. The fluctuations of the amplitude of the extracted signal (the envelope of the extracted signal) demonstrate how the system is able to reduce the asymmetric oscillations each time they arise.

In the lower plot, the steering signal is shown for the first scenario with no oscillations and the second scenario with asymmetric oscillations. When the asymmetric oscillations are present, the steering signal is modified using a steering damping signal, which is generated based on the extracted signal shown in the middle plot. The steering damping signal may be generated by time shifting the extracted signal by a phase lead or lag and by scaling the extracted signal with a multiplier.

Figure 6:
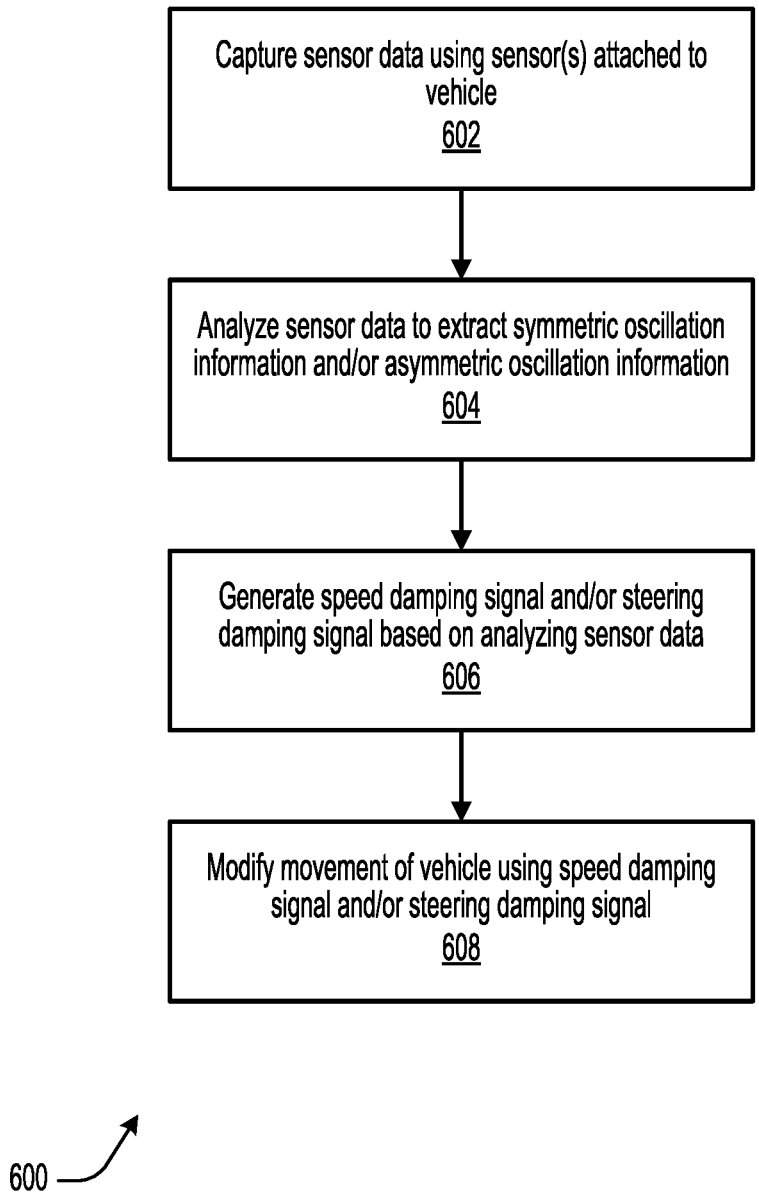
FIG. 6 illustrates a method of damping oscillations of an implement of a vehicle while the vehicle is moving.

FIG. 6 illustrates a method 600 of damping oscillations of an implement (e.g., implements 121, 221) of a vehicle (e.g., vehicles 150, 250) while the vehicle is moving, in accordance with some embodiments of the present disclosure. One or more steps of method 600 may be omitted during performance of method 600, and steps of method 600 need not be performed in the order shown. One or more steps of method 600 may be performed by one or more processors, such as those included in a control unit (e.g., control unit 360) of a machine control system (e.g., machine control system 300). Method 600 may be implemented as a computer-readable medium or computer program product comprising instructions which, when the program is executed by one or more computers, cause the one or more computers to carry out the steps of method 600.

At step 602, sensor data (e.g., sensor data 355, 455) is captured using one or more sensors (e.g., sensors 354) that are attached to the vehicle. The one or more sensors may include one or more inertial sensors (e.g., inertial sensors 165, 365). For example, the one or more sensors may include an accelerometer, a gyroscope, and/or an IMU. The sensor data may include accelerometer data (e.g., accelerometer data 124, 324, 424) captured by the accelerometer and/or gyro data (e.g., gyro data 126, 226, 426) captured by the gyroscope. The accelerometer data may include an acceleration signal that includes time-referenced acceleration values in the fore-aft direction of the vehicle. The gyro data may include a yaw signal that includes time-referenced yaw values with respect to a vertical axis of the vehicle. The one or more sensors may be attached to (e.g., mounted to) the implement or to another component of the vehicle, such as the tractor or cab of the vehicle. In one implementation, the accelerometer and the gyroscope may be included in an IMU that is mounted to the tractor or cab of the vehicle. In some implementations, the one or more sensors may be not be attached to the vehicle, and may instead be positioned at the site and directed toward the vehicle. For example, the one or more sensors may include a camera and/or a LiDAR sensor, among other possibilities.

At step 604, the sensor data is analyzed to extract one or both of symmetric oscillation information (e.g., symmetric oscillation information 438) or asymmetric oscillation information (e.g., asymmetric oscillation information 440). Extracting the symmetric oscillation information may include extracting a frequency and a phase corresponding to symmetric oscillations of the vehicle. The symmetric oscillation information may be extracted from the accelerometer data, which may include an acceleration signal. The frequency and the phase corresponding to symmetric oscillations may be extracted from the acceleration signal by filtering the acceleration signal with a band-pass filter. Extracting the asymmetric oscillation information may include extracting a frequency and a phase corresponding to asymmetric oscillations of the vehicle. The asymmetric oscillation information may be extracted from the gyro data, which may include a yaw signal. The frequency and the phase corresponding to asymmetric oscillations may be extracted from the yaw signal by filtering the yaw signal with a band-pass filter.

At step 606, one or both of a speed damping signal (e.g., speed damping signals 128, 328, 428) or a steering damping signal (e.g., steering damping signals 130, 330, 430) are generated based on analyzing the sensor data. The speed damping signal may be generated based on and in response to extracting the symmetric oscillation information. The speed damping signal may be generated using the frequency and the phase corresponding to the symmetric oscillations. In some examples, the speed damping signal may be a sinusoid having a frequency equal to the frequency corresponding to the symmetric oscillations. The steering damping signal may be generated based on and in response to extracting the asymmetric oscillation information. The steering damping signal may be generated using the frequency and the phase corresponding to the asymmetric oscillations. In some examples, the steering damping signal may be a sinusoid having a frequency equal to the frequency corresponding to the asymmetric oscillations.

At step 608, a movement of the vehicle is modified using one or both of the speed damping signal or the steering damping signal. The movement of the vehicle may be modified by modifying one or more control signals (e.g., control signals 357) that are sent to one or more actuators (e.g., actuators 356) of the vehicle. The one or more control signals may include a speed signal that controls the speed/velocity of the vehicle and/or a steering signal that controls the steering of the vehicle (e.g., rotational movement, left/right steering). The movement of the vehicle may be modified by combining the speed damping signal with an existing speed signal and/or by combining the steering damping signal with an existing steering signal. The speed damping signal can be combined with the existing speed signal by adding, subtracting, multiplying, or averaging the two signals, among other possibilities. The steering damping signal can be combined with the existing steering signal by adding, subtracting, multiplying, or averaging the two signals, among other possibilities.

Figure 7:
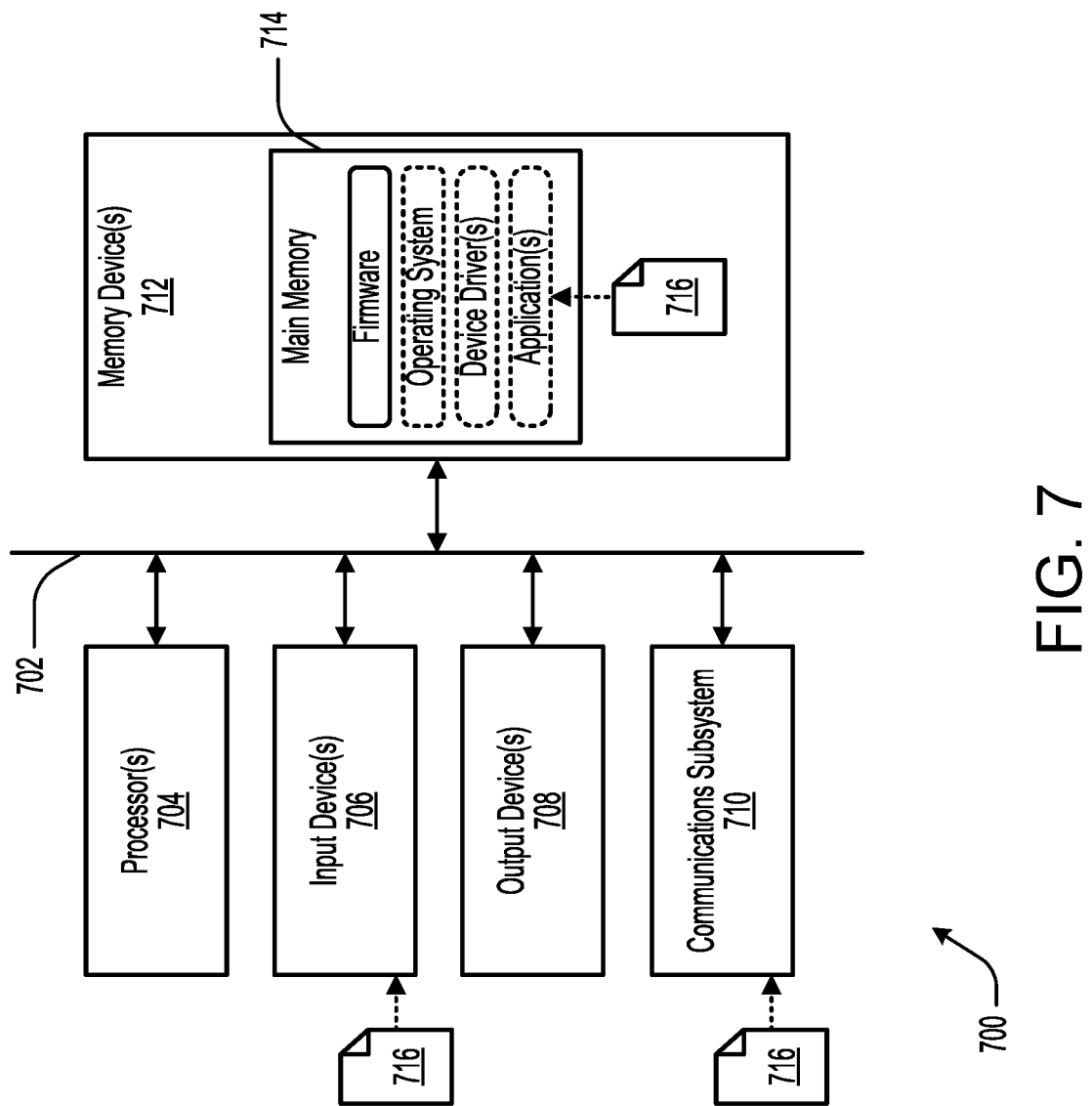
FIG. 7 illustrates an example computer system comprising various hardware elements.

FIG. 7 illustrates an example computer system 700 comprising various hardware elements, in accordance with some embodiments of the present disclosure. Computer system 700 may be incorporated into or integrated with devices described herein and/or may be configured to perform some or all of the steps of the methods provided by various embodiments. For example, in various embodiments, computer system 700 may be incorporated into control unit 360 and/or may be configured to perform method 600. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

In the illustrated example, computer system 700 includes a communication medium 702, one or more processor(s) 704, one or more input device(s) 706, one or more output device(s) 708, a communications subsystem 710, and one or more memory device(s) 712. Computer system 700 may be implemented using various hardware implementations and embedded system technologies. For example, one or more elements of computer system 700 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 700 may be coupled via communication medium 702. While communication medium 702 is illustrated as a single connection for purposes of clarity, it should be understood that communication medium 702 may include various numbers and types of communication media for transferring data between hardware elements. For example, communication medium 702 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 702 may include one or more buses connecting pins of the hardware elements of computer system 700. For example, communication medium 702 may include a bus connecting processor(s) 704 with main memory 714, referred to as a system bus, and a bus connecting main memory 714 with input device(s) 706 or output device(s) 708, referred to as an expansion bus. The system bus may consist of several elements, including an address bus, a data bus, and a control bus. The address bus may carry a memory address from processor(s) 704 to the address bus circuitry associated with main memory 714 in order for the data bus to access and carry the data contained at the memory address back to processor(s) 704. The control bus may carry commands from processor(s) 704 and return status signals from main memory 714. Each bus may include multiple wires for carrying multiple bits of information and each bus may support serial or parallel transmission of data.

Processor(s) 704 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 704 may include one or more multi-core processors, in which each core may read and execute program instructions simultaneously with the other cores.

Input device(s) 706 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 706 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 708 may include one or more of various devices that convert information into human-readable form, such as without limitation a display device, a speaker, a printer, and/or the like. Output device(s) 708 may also include devices for writing to removable storage devices or other removable media, such as those described in reference to input device(s) 706. Output device(s) 708 may also include various actuators for causing physical movement of one or more components. Such actuators may be hydraulic, pneumatic, electric, and may be provided with control signals by computer system 700.

Communications subsystem 710 may include hardware components for connecting computer system 700 to systems or devices that are located external computer system 700, such as over a computer network. In various embodiments, communications subsystem 710 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 712 may include the various data storage devices of computer system 700. For example, memory device(s) 712 may include various types of computer memory with various response times and capacities, from faster response times and lower capacity memory, such as processor registers and caches (e.g., L0, L1, L2), to medium response time and medium capacity memory, such as random access memory, to lower response times and lower capacity memory, such as solid state drives and hard drive disks. While processor(s) 704 and memory device(s) 712 are illustrated as being separate elements, it should be understood that processor(s) 704 may include varying levels of on-processor memory, such as processor registers and caches that may be utilized by a single processor or shared between multiple processors.

Memory device(s) 712 may include main memory 714, which may be directly accessible by processor(s) 704 via the memory bus of communication medium 702. For example, processor(s) 704 may continuously read and execute instructions stored in main memory 714. As such, various software elements may be loaded into main memory 714 to be read and executed by processor(s) 704 as illustrated in FIG. 7. Typically, main memory 714 is volatile memory, which loses all data when power is turned off and accordingly needs power to preserve stored data. Main memory 714 may further include a small portion of non-volatile memory containing software (e.g., firmware, such as BIOS) that is used for reading other software stored in memory device(s) 712 into main memory 714. In some embodiments, the volatile memory of main memory 714 is implemented as random-access memory (RAM), such as dynamic RAM (DRAM), and the non-volatile memory of main memory 714 is implemented as read-only memory (ROM), such as flash memory, erasable programmable read-only memory (EPROM), or electrically erasable programmable read-only memory (EEPROM).

Computer system 700 may include software elements, shown as being currently located within main memory 714, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 716, executable by computer system 700. In one example, such instructions 716 may be received by computer system 700 using communications subsystem 710 (e.g., via a wireless or wired signal carrying instructions 716), carried by communication medium 702 to memory device(s) 712, stored within memory device(s) 712, read into main memory 714, and executed by processor(s) 704 to perform one or more steps of the described methods. In another example, instructions 716 may be received by computer system 700 using input device(s) 706 (e.g., via a reader for removable media), carried by communication medium 702 to memory device(s) 712, stored within memory device(s) 712, read into main memory 714, and executed by processor(s) 704 to perform one or more steps of the described methods.

In some embodiments of the present disclosure, instructions 716 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 700. For example, the non-transitory computer-readable medium may be one of memory device(s) 712, as shown in FIG. 7, with instructions 716 being stored within memory device(s) 712. In some cases, the non-transitory computer-readable medium may be separate from computer system 700. In one example, the non-transitory computer-readable medium may a removable media provided to input device(s) 706, such as those described in reference to input device(s) 706, as shown in FIG. 7, with instructions 716 being provided to input device(s) 706. In another example, the non-transitory computer-readable medium may a component of a remote electronic device, such as a mobile phone, that may wirelessly transmit a data signal carrying instructions 716 to computer system 700 using communications subsystem 716, as shown in FIG. 7, with instructions 716 being provided to communications subsystem 710.

Instructions 716 may take any suitable form to be read and/or executed by computer system 700. For example, instructions 716 may be source code (written in a human-readable programming language such as Java, C, C++, C#, Python), object code, assembly language, machine code, microcode, executable code, and/or the like. In one example, instructions 716 are provided to computer system 700 in the form of source code, and a compiler is used to translate instructions 716 from source code to machine code, which may then be read into main memory 714 for execution by processor(s) 704. As another example, instructions 716 are provided to computer system 700 in the form of an executable file with machine code that may immediately be read into main memory 714 for execution by processor(s) 704. In various examples, instructions 716 may be provided to computer system 700 in encrypted or unencrypted form, compressed or uncompressed form, as an installation package or an initialization for a broader software deployment, among other possibilities.

In one aspect of the present disclosure, a system (e.g., computer system 700) is provided to perform methods in accordance with various embodiments of the present disclosure. For example, some embodiments may include a system comprising one or more processors (e.g., processor(s) 704) that are communicatively coupled to a non-transitory computer-readable medium (e.g., memory device(s) 712 or main memory 714). The non-transitory computer-readable medium may have instructions (e.g., instructions 716) stored therein that, when executed by the one or more processors, cause the one or more processors to perform the methods described in the various embodiments.

In another aspect of the present disclosure, a computer-program product that includes instructions (e.g., instructions 716) is provided to perform methods in accordance with various embodiments of the present disclosure. The computer-program product may be tangibly embodied in a non-transitory computer-readable medium (e.g., memory device(s) 712 or main memory 714). The instructions may be configured to cause one or more processors (e.g., processor(s) 704) to perform the methods described in the various embodiments.

In another aspect of the present disclosure, a non-transitory computer-readable medium (e.g., memory device(s) 712 or main memory 714) is provided. The non-transitory computer-readable medium may have instructions (e.g., instructions 716) stored therein that, when executed by one or more processors (e.g., processor(s) 704), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of damping oscillations of an implement of a vehicle while the vehicle is moving, the method comprising:
   capturing sensor data using one or more sensors that are attached to the vehicle;
   analyzing the sensor data to extract symmetric oscillation information and asymmetric oscillation information from the sensor data, wherein extracting the symmetric oscillation information includes extracting a frequency and a phase corresponding to symmetric oscillations of the vehicle, and wherein extracting the asymmetric oscillation information includes extracting a frequency and a phase corresponding to asymmetric oscillations of the vehicle;
   generating (i) a speed damping signal using the frequency and the phase corresponding to the symmetric oscillations and (ii) a steering damping signal using the frequency and the phase corresponding to the asymmetric oscillations, wherein the steering damping signal is generated by extracting a signal from the sensor data having the frequency corresponding to the asymmetric oscillations, time-shifting the extracted signal based on the phase corresponding to the asymmetric oscillations, and scaling the extracted signal; and
   modifying a movement of the vehicle using the speed damping signal and the steering damping signal.

2. The method of claim 1, wherein capturing the sensor data includes capturing accelerometer data using an accelerometer attached to the vehicle.

3. The method of claim 2, wherein the symmetric oscillation information is extracted from the accelerometer data.

4. The method of claim 1, wherein capturing the sensor data includes capturing gyro data using a gyroscope attached to the vehicle.

5. The method of claim 4, wherein the asymmetric oscillation information is extracted from the gyro data.

6. The method of claim 1, wherein modifying the movement of the vehicle using the speed damping signal includes combining the speed damping signal with an existing speed signal.

7. The method of claim 1, wherein modifying the movement of the vehicle using the steering damping signal includes combining the steering damping signal with an existing steering signal.

8. The method of claim 1, wherein the speed damping signal is generated to include the frequency corresponding to the symmetric oscillations.

9. A non-transitory computer-readable medium comprising instructions that, when executed by one or more processors, cause the one or more processors to perform operations for damping oscillations of an implement of a vehicle while the vehicle is moving, the operations comprising:
   capturing sensor data using one or more sensors that are attached to the vehicle;
   analyzing the sensor data to extract symmetric oscillation information and asymmetric oscillation information from the sensor data, wherein extracting the symmetric oscillation information includes extracting a frequency and a phase corresponding to symmetric oscillations of the vehicle, and wherein extracting the asymmetric oscillation information includes extracting a frequency and a phase corresponding to asymmetric oscillations of the vehicle;
   generating (i) a speed damping signal using the frequency and the phase corresponding to the symmetric oscillations and (ii) a steering damping signal using the frequency and the phase corresponding to the asymmetric oscillations, wherein the steering damping signal is generated by extracting a signal from the sensor data having the frequency corresponding to the asymmetric oscillations, time-shifting the extracted signal based on the phase corresponding to the asymmetric oscillations, and scaling the extracted signal; and
   modifying a movement of the vehicle using the speed damping signal and the steering damping signal.

10. The non-transitory computer-readable medium of claim 9, wherein capturing the sensor data includes capturing accelerometer data using an accelerometer attached to the vehicle.

11. The non-transitory computer-readable medium of claim 10, wherein the symmetric oscillation information is extracted from the accelerometer data.

12. The non-transitory computer-readable medium of claim 9, wherein capturing the sensor data includes capturing gyro data using a gyroscope attached to the vehicle.

13. The non-transitory computer-readable medium of claim 12, wherein the asymmetric oscillation information is extracted from the gyro data.

14. The non-transitory computer-readable medium of claim 9, wherein modifying the movement of the vehicle using the speed damping signal includes combining the speed damping signal with an existing speed signal.

15. A system for damping oscillations of an implement of a vehicle while the vehicle is moving, the system comprising:
   one or more processors; and
   a computer-readable medium comprising instructions that, when executed by the one or more processors, cause the one or more processors to perform operations comprising:
      capturing sensor data using one or more sensors that are attached to the vehicle;
      analyzing the sensor data to extract symmetric oscillation information and asymmetric oscillation information from the sensor data, wherein extracting the symmetric oscillation information includes extracting a frequency and a phase corresponding to symmetric oscillations of the vehicle, and wherein extracting the asymmetric oscillation information includes extracting a frequency and a phase corresponding to asymmetric oscillations of the vehicle;

generating (i) a speed damping signal using the frequency and the phase corresponding to the symmetric oscillations and (ii) a steering damping signal using the frequency and the phase corresponding to the asymmetric oscillations, wherein the steering damping signal is generated by extracting a signal from the sensor data having the frequency corresponding to the asymmetric oscillations, time-shifting the extracted signal based on the phase corresponding to the asymmetric oscillations, and scaling the extracted signal; and modifying a movement of the vehicle using the speed damping signal and the steering damping signal.

16. The system of claim 15, wherein capturing the sensor data includes capturing accelerometer data using an accelerometer attached to the vehicle.

17. The system of claim 16, wherein the symmetric oscillation information is extracted from the accelerometer data.

18. The system of claim 15, wherein capturing the sensor data includes capturing gyro data using a gyroscope attached to the vehicle.

19. The system of claim 18, wherein the asymmetric oscillation information is extracted from the gyro data.

* * * * *